United States Patent
Gillen

(10) Patent No.: US 7,025,405 B2
(45) Date of Patent: Apr. 11, 2006

(54) SUBSTANTIALLY FLUSH MOUNTED VEHICULAR WINDOW FRAME ASSEMBLY AND METHOD FOR PRODUCING

(75) Inventor: John H. Gillen, Ottawa Lake, MI (US)

(73) Assignee: Pilkington North America, Inc., Toledo, OH (US)

( * ) Notice: Subject to any disclaimer, the term of this patent is extended or adjusted under 35 U.S.C. 154(b) by 0 days.

(21) Appl. No.: 10/349,130

(22) Filed: Jan. 22, 2003

(65) Prior Publication Data
US 2003/0137161 A1 Jul. 24, 2003

Related U.S. Application Data

(60) Provisional application No. 60/351,349, filed on Jan. 24, 2002.

(51) Int. Cl.
*B60J 1/00* (2006.01)
*E05D 15/20* (2006.01)

(52) U.S. Cl. ............... 296/146.16; 296/210; 49/130

(58) Field of Classification Search ............ 296/190.1, 296/146.16, 201; 49/125, 127, 130, 380, 49/413
See application file for complete search history.

(56) References Cited

U.S. PATENT DOCUMENTS

| | | | |
|---|---|---|---|
| 4,072,340 A | 2/1978 | Morgan | |
| 4,124,054 A * | 11/1978 | Spretnjak | 49/413 |
| 4,561,625 A | 12/1985 | Weaver | |
| 4,662,113 A | 5/1987 | Weaver | |
| 4,755,339 A | 7/1988 | Reilly et al. | |
| 4,839,122 A | 6/1989 | Weaver | |
| 4,951,927 A | 8/1990 | Johnston et al. | |
| 4,996,808 A | 3/1991 | Weaver | |
| 5,060,440 A | 10/1991 | Weaver | |
| 5,294,168 A | 3/1994 | Kronbetter | |
| 5,442,880 A | 8/1995 | Gipson | |
| 5,505,023 A * | 4/1996 | Gillen et al. | 49/380 |
| 5,522,191 A | 6/1996 | Wenner et al. | |
| 5,542,214 A | 8/1996 | Buening | |
| 5,560,671 A * | 10/1996 | Ojanen et al. | 296/146.14 |
| 5,799,444 A | 9/1998 | Freimark et al. | |
| 5,822,932 A | 10/1998 | Agrawal | |
| 5,996,284 A * | 12/1999 | Freimark et al. | 49/380 |

(Continued)

FOREIGN PATENT DOCUMENTS

DE 199 38 789 A1 2/2000

(Continued)

OTHER PUBLICATIONS

Search Report-European Patent Office Apr. 20, 2004.

*Primary Examiner*—Dennis H. Pedder
(74) *Attorney, Agent, or Firm*—Marshall & Melhorn LLC.

(57) ABSTRACT

A substantially flush mounted vehicular window frame assembly and method for producing same are provided, where a slider panel can be moved in either direction across a fixed panel having a window aperture defined therein. Stationary rails, near horizontal edges of the aperture, run in parallel and extend the width of the assembly. The slider panel with locator rails attached to two edges, mates with and moves between the stationary rails. Pillar seals attached to the fixed panel near vertical aperture edges, make sealable contact with the slider panel when it covers the aperture. Slider seals attached to fixed panel edges that form the horizontal edges of the aperture, make sealable contact with the slider panel when it covers the aperture. Flush mounting of the assembly is achieved by placing the window frame assembly and associated panels in substantially an exterior vehicle body frame plane.

18 Claims, 10 Drawing Sheets

U.S. PATENT DOCUMENTS

| | | |
|---|---|---|
| 6,220,650 B1 | 4/2001 | Davis et al. |
| 6,293,609 B1 | 9/2001 | Xu et al. |
| 6,572,176 B1 | 6/2003 | Davis et al. |
| 6,588,152 B1 | 7/2003 | Cabbane |
| 6,591,552 B1 | 7/2003 | Rasmussen |

FOREIGN PATENT DOCUMENTS

| | | |
|---|---|---|
| EP | 294 254 A | 12/1988 |
| EP | 1 048 500 A | 11/2000 |
| FR | 2 552 483 A1 | 3/1985 |

* cited by examiner

SUBSTANTIALLY FLUSH MOUNTED VEHICULAR WINDOW FRAME ASSEMBLY AND METHOD FOR PRODUCING

RELATED APPLICATIONS

This application claims the benefit of U.S. Provisional Patent Application Ser. No. 60/351,349, filed Jan. 24, 2002, which application is incorporated herein in its entirety.

BACKGROUND OF THE INVENTION

The present invention relates to window frame assemblies and, in particular, to an assembly having a sliding panel mechanism and seal system for vehicular backlites. More particularly, the present invention relates to a window frame assembly that has a sliding panel mechanism and seal system for vehicular backlites that is substantially flush mounted into a vehicle body aperture in a vehicle body frame and method for producing.

Pickup trucks and other related vehicles have a rear window, or backlite, that is mounted in the vehicle body aperture, immediately behind the seats in the vehicle passenger compartment. Typically, such backlites are supplied either to the pickup truck manufacturers as body frame assemblies for installation in new vehicles being manufactured on the assembly line, or they may be supplied to retail auto part stores for direct sales to existing truck owners, in the after market.

Backlite assemblies typically include a metal window frame, made of, for example, aluminum, provided with top and bottom channels to facilitate the sliding of the glass panel. Typically, a plastic frame surrounds the entire assembly.

The backlite assembly can then be mounted directly into the vehicle body aperture in the vehicle body frame. This assembly is secured to the vehicle body aperture with adhesives and/or mechanical fastener devices. A urethane adhesive is frequently used in the backlite applications, such adhesive being applied to a mounting surface of either the vehicle body aperture or the backlite assembly prior to the moment at which these two structures are brought into bonding contact. The result of such conventional configurations is that a cumulative thickness of the channel, seals, and various other parts cause the assembly of those parts to typically project outwardly from the vehicle body aperture.

In addition, the backlite assembly in the pickup truck can be a source of problems, such as water leakage. The leakage may occur at an engagement of the backlite assembly and the body panel, which is typically caused by improper adhesive application or body distortion. Water leakage may also occur around a window aperture seal extending about the edges of the window aperture. The edges of the window aperture are formed by fixed panels, which may have a pillar mounted therebetween. Tight sealing is required on all edges of a sliding panel to ensure integrity of the entire window aperture seal.

A primary configuration that has been used in backlite assemblies consists of an assembly having a metal bracket with two channels extending around the complete perimeter of the assembly. The fixed panels are mounted in an outer channel in planar, spaced-apart relationship with two horizontal and two vertical seals secured in the outer channel surrounding the aperture between the panels. The sliding panel is disposed in an inner channel, adjacent the fixed panels. In the closed position, the sliding panel sealably engages the seals to seal the window aperture between the fixed panels and, if necessary, between each other. When moved to an open position, the sliding panel slides in the internal channel to overlap the fixed panels in the outer channel and, if necessary, each other.

The window aperture seals are made from rubber, plastic, or suitable material, for example, ethylene propylene diene monomer (EPDM), and include an extended lip, which flexibly engages the sliding panel to prevent water and dirt from entering around the sliding panel. These seals are mounted in the outer channel between the fixed panels. The window aperture seals facilitate movement of the sliding panel in a horizontal direction while maintaining sufficient pressure at the lip of the seal to prevent water from leaking around the seal to the interior of the assembly and ultimately, into the vehicle passenger compartment.

A manual production step is required to properly install the seals around the window frame assembly. Window manufacturers have found an alternative, but not entirely satisfactory, sealing system, which seals the window frame without discrete rubber or suitable seals, thereby reducing material and labor costs during production operations and improving the integrity of the seal around the sliding panel.

Although rubber or suitable seals are expensive and difficult to install, such may still be required or preferred in certain embodiments. If these seals are not installed properly, then water leakage may occur in the horizontal channels or along the vertical edges of the vehicle body aperture. An improved method, such as encapsulation, for securing these seals about the window frame assembly in the backlite is also desired in the industry.

In addition to the sealing requirements noted above, there are several additional performance requirements, which often present problems in the use of the sliding panel assemblies in pickup trucks. In the closed position, it is intended that the backlite panel assembly maintain the noise level in the passenger compartment within acceptable limits. The noise to be closed out of the vehicle results from wind and road noise. Channel drain holes and other design features are used to remove moisture as it is encountered, but may result in increased noise in the vehicle passenger compartment.

High or variable sliding force is another concern in backlite panel assemblies. The sliding panel typically includes rubber or plastic guides to secure the slidable panel within the bottom internal channel. The slidable panel should slide freely within the guides while still being positioned to sealably engage the lip of the rubber-sealing member. If the seals are installed improperly, due to, for example, misalignment, then the movable panel may be difficult to slide. The channels of the window frame may also be misaligned. The sliding characteristics of the rubber or suitable seals and the channel guides should permit the sliding of the sliding panel while maintaining the necessary seal force between the sliding panel and the seal.

Another problem, which frequently occurs with backlite assemblies, is a sliding panel rattle. When the sliding panel is moved to an open position, the channel guides should retain the sliding panel, so as to prevent rattling of the panel, during operation of the vehicle.

Achieving a substantially flush window assembly in the vehicle is an additional criterion that has been applied to a sliding panel assembly. The advantage of achieving substantially flush mounting of the sliding panel assembly is that the appearance of the assembly in the vehicle is improved, when compared to sliding panel assemblies that protrude out and away from the vehicle passenger compartment's overall rear body frame.

Typically, substantial flush mounting of the sliding panel assembly can be achieved by: (1) having the panels of the window assembly substantially in the same plane as the window assembly frame, (2) having the sliding panel flush with the fixed panels when the sliding panel is closed and then allowing the sliding panels to be moved behind the fixed panels when the sliding glass is opened, (3) insetting into the vehicle body frame the entire window frame assembly and then bringing the outside surface of the window panels to a substantially flush position in relationship to the vehicle body frame, (4) moving the sliding panels into a recess of the vehicle body aperture, and (5) placing the window assembly in the plane of the exterior vehicle body frame plane and then minimizing the separation of the fixed and sliding panels so as to achieve a substantially flush mounted appearance.

In summary, a backlite window assembly with a sliding panel assembly should maintain a proper seal to reduce or eliminate water leaks and wind/road noise in a closed position. The slidable panel, without compromising the required seal, should be easy to move. In the open position, the sliding panel assembly should be secured in the channel to prevent rattling of the panel. For appearance, substantially flush mounting is a desirable feature that can be applied to a backlite window assembly.

Adhesives are used, conventionally, to secure the backlite assembly in the body opening of a pickup truck and to secure the rubber or suitable seals and the guides in the assembly. Slip coats and other lubricants are often used to facilitate the sliding of the sliding panel assembly against the window aperture seal and the guide walls. Applying adhesives and lubricants in such proximity on the same assembly line adds to the production costs and could cause quality problems if either is applied improperly.

A window frame assembly for pickup truck backlites is disclosed in U.S. Pat. No. 5,294,168 to Kronbetter. The Kronbetter window assembly includes a complex top and bottom rail with two channels, an outer channel for mounting the two outer pieces of fixed glass and the rubber or equivalent sealing members, and an inner channel for securing the guides and the sliding windows.

In Kronbetter, the assembly of the window frame starts with the insertion of the guides into the inner channels. Adhesive is applied to the outer channel to secure the fixed window panels in the window frame. The sliding window panels are inserted into the guides and the bottom metal window frame segment and the bowed, top metal window frame segment are welded or otherwise bonded together. The sealing members are then placed in the outer channel of the window frame to slidably and sealably engage the sliding panels in the inner channel. The window frame assembly is then ready for installation into a pickup truck.

The metal window frame of the window assembly in Kronbetter is expensive to manufacture and assemble. Pickup truck manufacturers, for example, currently, desire a less expensive window assembly that is easier to mount and still meets all of the performance requirements.

In recent years, motor vehicle glass suppliers have been supplying to motor vehicle manufacturers, modular windows having urethane gaskets molded in situ by means of reaction injection molding (RIM). These gaskets encapsulate the peripheral edge of the glass window and provide an effective seal between the glass and the vehicle body frame in the vehicle body aperture. Encapsulation of a gasket is accomplished by placing a glass sheet in a suitable mold and then injecting into the mold a plastic-forming composition, which is in a liquid form, about the window frame periphery thereof, wherein the composition polymerizes and cures in contact with the sheet and tightly adheres thereto.

Prior to the development of the reaction injection molding process, vehicle window assemblies were comprised of a plurality of elements, including adhesive sealants applied around the marginal edges of the panel sheet, suitable mechanical fasteners such as metal clips, and exterior decorative trim strips disposed to cover the junction between the marginal edges of the panel sheet and the adjacent portion of the vehicle body frame.

The initial vehicular window gaskets were formed from a molded plastic material, such as polyvinyl chloride. The relatively high pressure required for the PVC injection molding process, however, resulted in glass breakage and other production related problems. The PVC window assembly process is described, for example, in U.S. Pat. No. 4,072,340 to Morgan.

In the 1980's, the reaction injection molding encapsulation process was developed to produce modular windows, which would reduce glass breakage and facilitate the installation of motor vehicle windows by robots. U.S. Pat. No. 4,561,625 to Weaver describes the use of polyurethanes molded on the peripheral edges of the glass at low pressures through the use of a RIM technique. The polyurethane gasket was of great significance since it eliminated the need for the conventional adhesive sealants, ancillary metal clips and exterior decorative trim strips disposed to cover the junction between the marginal edges of the glass sheet and the adjacent portions of the vehicle body frame.

More recently, injection molding processes, using PVC to form an encapsulated frame seal, have been applied with favorable results, since the PVC materials are, typically, less expensive than the materials used in RIM processes.

U.S. Pat. No. 4,755,339 to Reilly et al. and U.S. Pat. No. 4,839,122 to Weaver disclose further details regarding the method and apparatus for reaction injection molding of window gaskets.

Metal brackets and spacers have been incorporated into the reaction injection molding process to improve the functionality of the glass. U.S. Pat. No. 4,662,113 to Weaver shows a window assembly used for door windows on motor vehicles, which is operated in a vertical manner. A bracket is placed in the mold with the window glass and is integrally secured to the window glass during the formation of the gasket by the RIM injection molding process. The bracket provides a means to connect a linkage or other drive means to the window glass to raise and lower the window in the motor vehicle.

U.S. Pat. No. 4,951,927 to Johnston et al. shows a spacer element used to maintain spacing between two sheets of glass. The spacer is positioned about the window frame periphery of the sheets of glazed glass prior to positioning the glass in a mold for reaction injection molding, in order to form an encapsulating gasket around the peripheral edge portions of both sheets of glass, so as to produce a multiple glazed structure.

Because of the desirable features of the gaskets formed by reaction injection molding, the process has been used for several additional applications. U.S. Pat. No. 5,060,440 to Weaver discloses two glass sheets flexibly connected by adjacent gaskets joined during the reaction injection molding process. U.S. Pat. No. 4,996,808 to Weaver discloses an encapsulated window assembly in which a preformed sheet of plastic material is placed in the mold prior to the gasket forming process.

More recently, seal encapsulation techniques have been proposed, where thermoplastic elastomers are applied. U.S.

Pat. No. 5,822,932 to Agrawal discusses the improved long-term, failure-resistant bonding that gaskets made from melt-processible thermoplastics provide over typical RIM materials.

U.S. Pat. No. 6,293,609 to Xu et al. is cited, wherein the potential benefits of thermoplastic elastomers over typical RIM urethane and PVC material are discussed. Some of those benefits are: (1) improvement in seal life when the seal experiences prolonged exposure to UV light, (2) lower manufacturing cycle time to produce the seals, (3) lower material costs, (4) longer seal life due to more resistance to tension or shear forces between the seal and the window panel, (5) less complex seal manufacturing, where added gaskets and sealants are not required, (6) better low temperature operating characteristics, and (7) better "creep" resistance, where "creep" is the movement of a seal from its intended sealing position.

Regarding substantially flush mounting of sliding window assemblies, U.S. Pat. No. 5,442,880 to Gipson achieves substantially flush mounting by placing the outside surfaces of the panels in substantially the same plane as the sliding window assembly's peripheral frame. In the Gipson patent, the outside surface of the panels and the outside surface of the peripheral frame, however, appear to protrude from the outside surface of the vehicle frame surface.

U.S. Pat. No. 5,522,191 to Wenner et al. achieves the appearance of substantially flush mounting by allowing the sliding window assembly to protrude into the vehicle passenger compartment while displacing the exterior surface of the slider window assembly essentially in-line with the contour of the adjacent body panel.

U.S. Pat. No. 5,542,214 to Buening uses a mechanism to place the sliding glass in the same plane as the fixed glass plane when the sliding glass is in the closed position, wherein the sliding glass pane is moved in-line with the fixed panes. To open the sliding glass pane, a grooved slide is provided for the mechanism to place the sliding glass inside of the vehicle passenger compartment and behind the fixed glass panes.

U.S. Pat. No. 5,799,444 to Freimark et al. has a sliding vehicle window that is substantially flush with the fixed glass panes when the window aperture is closed. Through the use of a cam mechanism, the sliding glass pane is placed inside the vehicle passenger compartment, which allows the sliding glass pane to move away from the window aperture and then behind the fixed glass panel.

U.S. Pat. No. 6,220,650 to Davis et al. provides a substantially flush mounted, sliding glass panel that can be used as a vent window on the side of a vehicle or as a backlite in a rear window, wherein the slidable window moves down in a door panel or in a rear recess panel, much like a conventional vehicle side window.

Still, those skilled in the art continued to seek a solution to the problem of how to provide a better substantially flush mounted vehicular window frame assembly.

SUMMARY OF THE INVENTION

A substantially flush mounted vehicular window frame assembly is provided having at least one fixed panel being positioned so as to define at least a portion of a window aperture, a first stationary rail and a second stationary rail disposed parallel to each other on a major surface of the fixed panel, the first stationary rail being positioned above the window aperture and the second stationary rail being positioned below the window aperture. The frame assembly further having a sliding panel assembly including at least one slider panel having opposed first and second slider panel edges, at least one major surface, and a first locator rail disposed onto the first slider panel edge and a second locator rail disposed onto the second slider panel edge.

The frame assembly further includes the first locator rail being brought into mating contact with the first stationary rail and the second locator rail being brought into mating contact with the second stationary rail, thus forming a sliding panel assembly being capable of sliding movement across the stationary rails, and being further capable of at least partially closing the window aperture.

To prevent noise and moisture from entering a vehicle compartment through the window aperture, first and second slider seals are disposed on opposite edges, on upper and lower portions of the window aperture, while pillar seals are disposed on opposite vertical edges of the window aperture. Both slider and pillar seals make sealable contact with the slider panel when the slider panel at least partially closes the window aperture.

As a result, substantially flush mounting of the assembly is achieved by placing the window frame assembly and the fixed and slider panels in substantially an exterior vehicle body frame plane.

Further objects and advantages of the present invention will be apparent from the following description and appended claims, reference being made to the accompanying drawings forming a part of a specification, wherein like reference characters designate corresponding parts of several views.

DESCRIPTION OF THE PREFERRED EMBODIMENT

Figure 1:
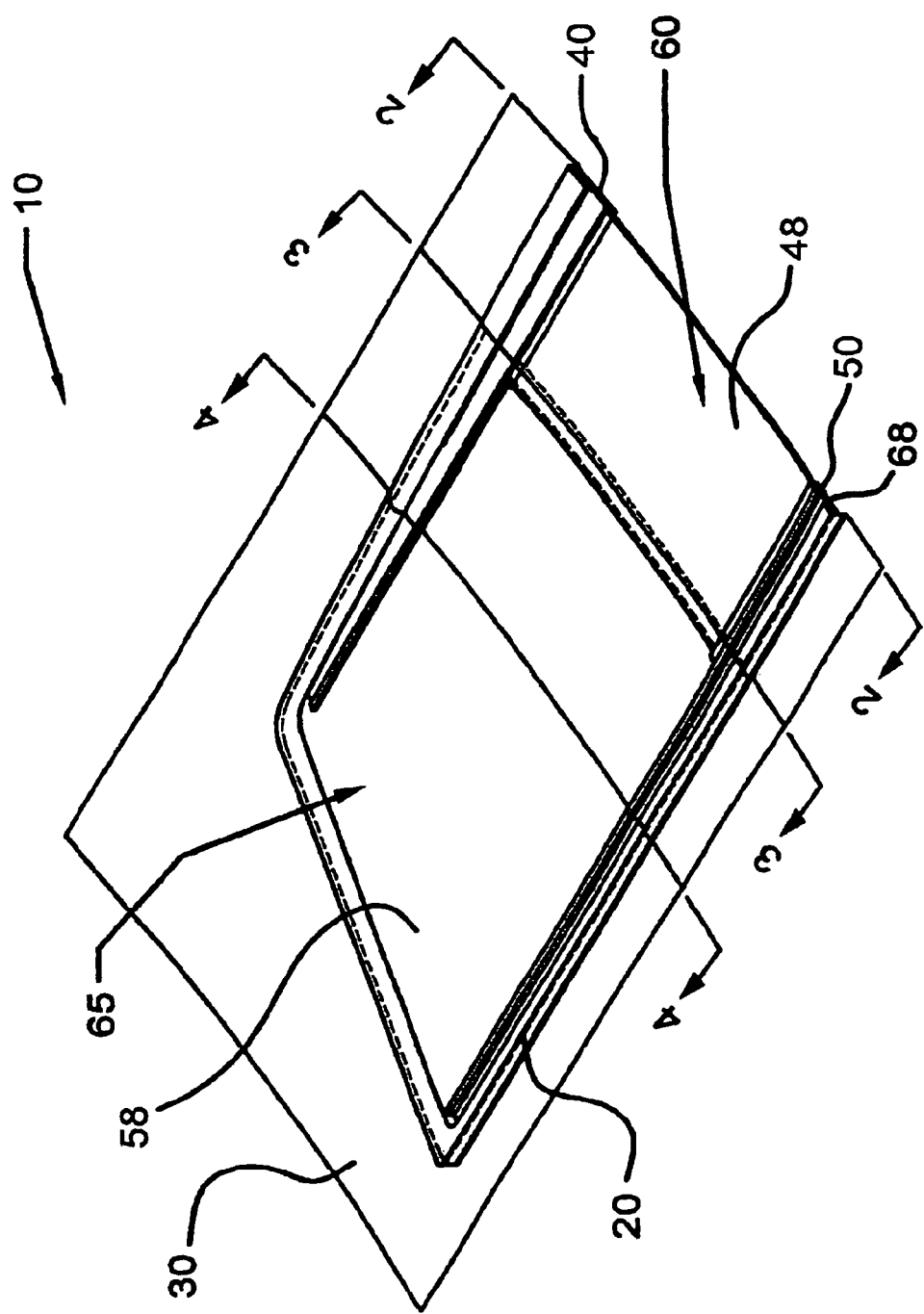
FIG. 1 is an elevation view of a portion of a substantially flush mounted vehicular window frame assembly in accordance with the present invention.

Referring now to FIG. 1, there is shown an elevation view of a portion of a substantially flush mounted vehicular window frame assembly 10, from a perspective of being within a vehicle passenger compartment, where a portion of a window aperture 60 is shown. As shown, a window frame assembly 20, at a window frame periphery 68, is mounted into a vehicle body aperture 65 in a vehicle body frame 30. Also shown are three viewing lines where sectional views are to be observed along a viewing line 2—2, along a viewing line 3—3, and along a viewing line 4—4.

Figure 11:
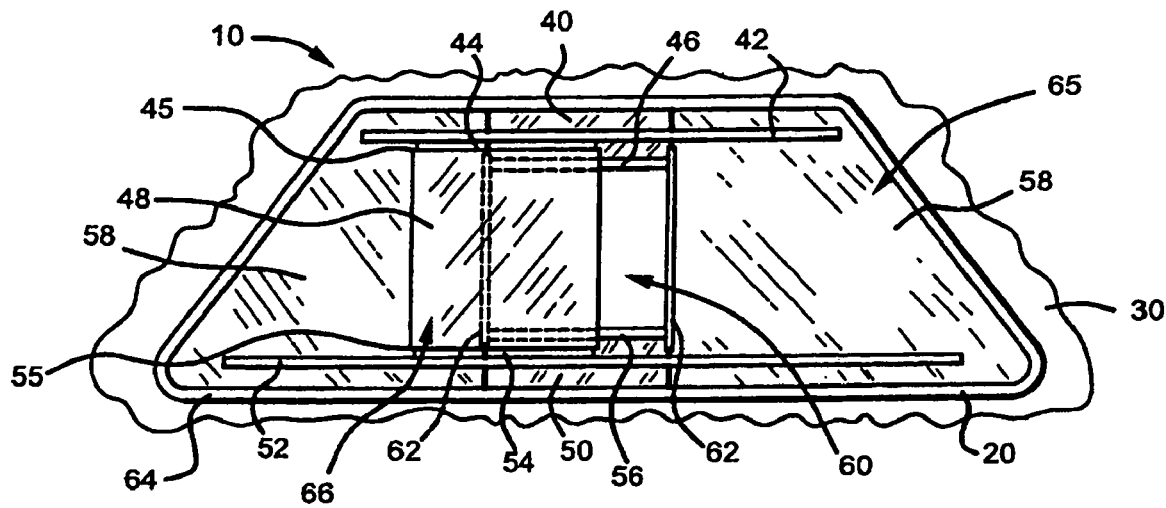
FIG. 11 is an elevation view of a two fascia panels/two fixed panels embodiment of FIG. 1.

FIG. 11 shows a complete elevation view, taken as one would view the window frame assembly 20 from inside the vehicle, of the two fascia panels 40, 50/two fixed panels 58, 58 embodiment of the present invention. As illustrated, FIG. 11 is FIG. 1 with substantially a mirror image of the remaining portion of FIG. 1 and having the herein-stated features of FIG. 1.

Figure 2:
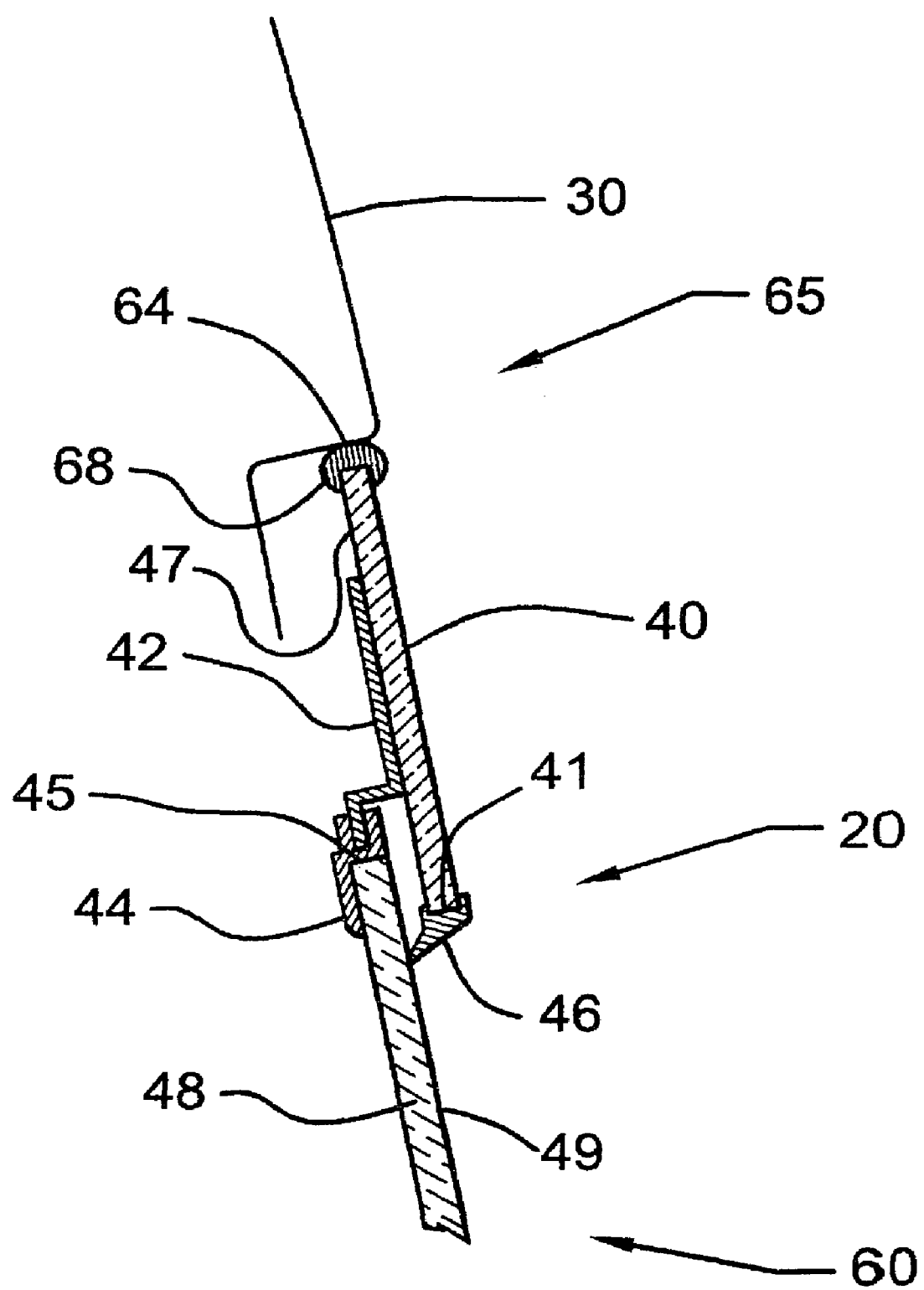
FIG. 2 is an upper portion, sectional view, taken in the direction of the arrows, along the section line 2—2 of FIG. 1.

FIG. 2 illustrates a sectional view of an upper portion of FIG. 1, taken along the viewing line 2—2. This view shows that the appearance of substantially flush mounting is achieved by providing a cumulative thickness of the window frame assembly 20 that is between the exterior and the interior surface of the vehicle body aperture 65. A first stationary rail 42 is attached to a first fascia surface 47 of a first fascia panel 40. The first stationary rail 42, which extends across the length of the window frame assembly 20, mates with and consequently provides a sliding pathway for a sliding panel assembly 66 that comprises a first locator rail 44, which is attached to a first slider panel edge 45 on at least one slider panel 48, to allow sliding movement across the window frame assembly 20. The first fascia panel 40 could comprise, for example, glass or plastic. The at least one slider panel 48 could comprise, for example, glass or plastic.

Also shown is a first slider seal 46 that is attached to a first fascia edge 41 of the first fascia panel 40. The first slider seal 46 makes sealable contact, on the outside of the vehicle passenger compartment, with the at least one slider panel 48 on a slider surface 49 of the at least one slider panel 48. The first slider seal 46 helps to seal out noise and moisture from entering the vehicle passenger compartment when the sliding panel assembly 66 is closed across the window aperture 60. The first slider seal 46 could comprise, for example, ethylene propylene diene monomer. At the vehicle body aperture 65 a window frame assembly seal 64 has been disposed on the window frame periphery 68. The window frame assembly seal 64 could comprise, for example, an encapsulation process that could be formed by a reaction injection molding process or a thermoplastic elastomer injection molding process. Or the window frame assembly seal 64 could comprise, for example, a one-sided or one-sided and edge window frame assembly seal 64 that is disposed on and around the window frame periphery 68.

Figure 3:
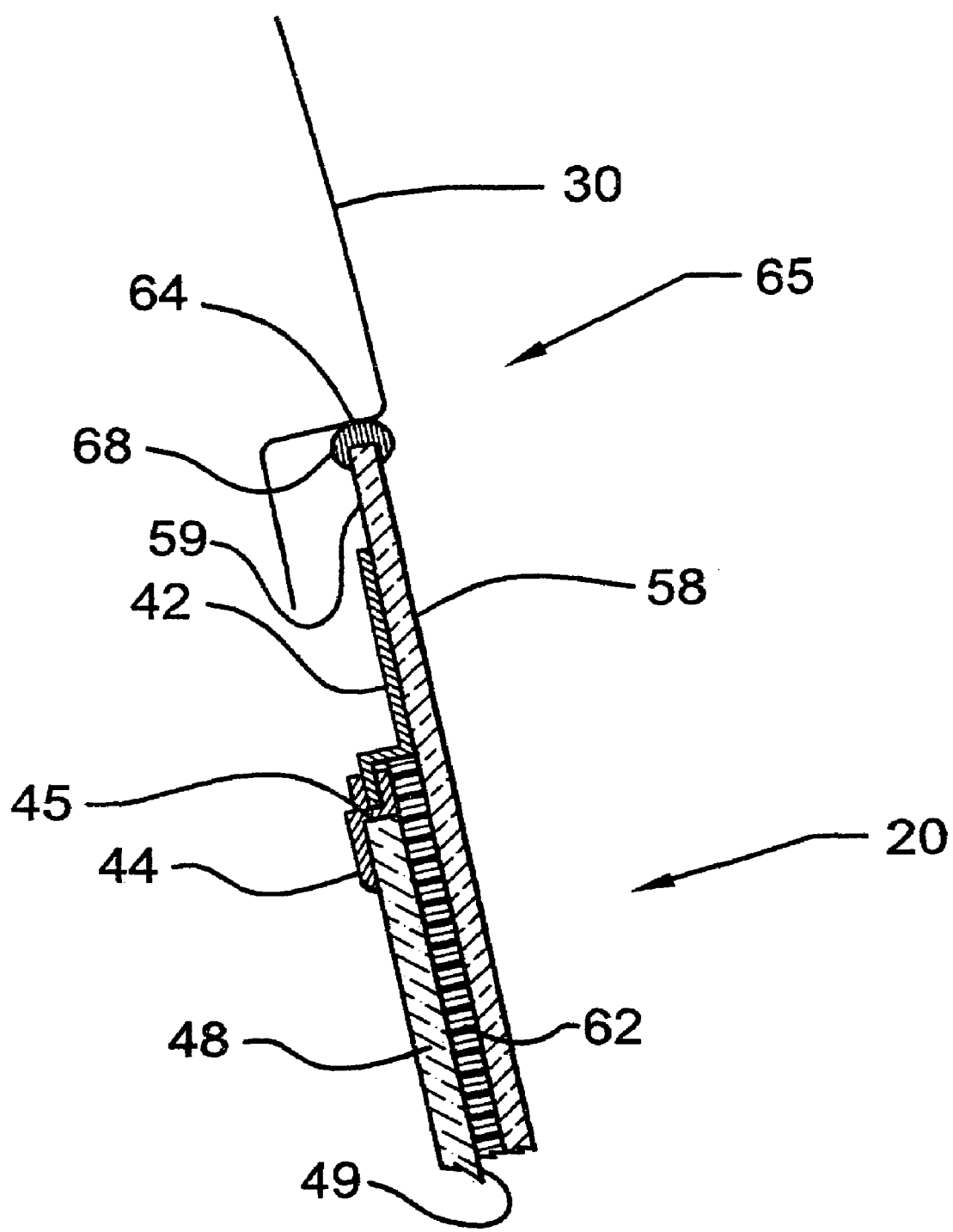
FIG. 3 is the upper portion, sectional view, taken in the direction of the arrows, along the section line 3—3 of FIG. 1.

FIG. 3 shows a sectional view of the upper portion of FIG. 1, taken along the viewing line 3—3, where the first stationary rail 42 is attached to a fixed panel surface 59 of at least one fixed panel 58. The first stationary rail 42 mates with and consequently provides the sliding pathway for the first locator rail 44, which is attached to a first slider panel edge 45 on the at least one slider panel 48. This operates to: (1) contain the assemblage of the first locator rail 44 and the at least one slider panel 48 within the window frame assembly 20, (2) maintain a separation between the assemblage of the first locator rail 44 and the at least one slider panel 48, and the at least one fixed panel 58, and (3) allow the assemblage of the first locator rail 44 and the at least one slider panel 48 to slide across the upper portion of the window frame assembly 20. The at least one fixed panel 58 could comprise, for example, glass or plastic.

Also shown is a pillar seal 62 that is attached to the fixed panel surface 59, near to the window aperture 60 (shown in FIG. 1) of the at least one fixed panel 58. The pillar seal 62 makes sealable contact with the at least one slider panel 48 on the outside slider surface 49 of the at least one slider panel 48, in order to seal out noise and moisture from entering the vehicle passenger compartment when the at least one slider panel 48 is closed across the window aperture 60. The pillar seal 62 could comprise, for example, ethylene propylene diene monomer. At the vehicle body aperture 65 the window frame assembly seal 64 has been disposed on the window frame periphery 68. The window frame assembly seal 64 could comprise, for example, an encapsulation process that could be formed by a reaction injection molding process or a thermoplastic elastomer injection molding process. The window frame assembly seal 64 could also comprise, for example, a one sided or one sided and edge window frame assembly seal 64 that is disposed on and around the window frame periphery 68.

Figure 4:
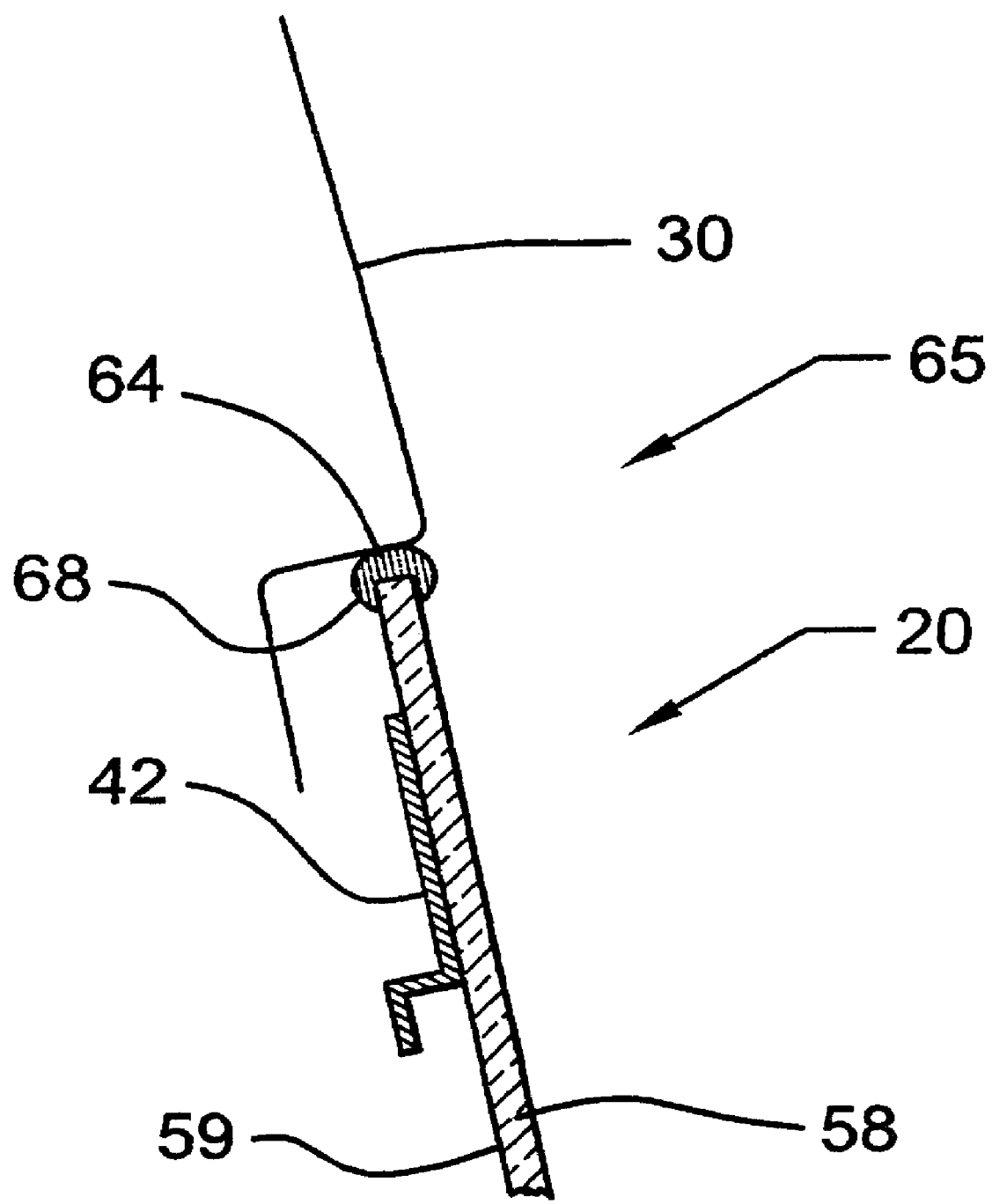
FIG. 4 is the upper portion, sectional view, taken in the direction of the arrows, along the section line 4—4 of FIG. 1.

Referring to FIG. 4, there is shown a sectional view of the upper portion of FIG. 1, taken along the viewing line 4—4, where the window frame assembly 20 is disposed into the vehicle body frame 30. The first stationary rail 42 is attached to the fixed panel surface 59 on the at least one fixed panel 58. At the vehicle body aperture 65 the window frame assembly seal 64 has been disposed on the window frame periphery 68. The window frame assembly seal 64 could comprise, for example, an encapsulation process that could be formed by a reaction injection molding process or a thermoplastic elastomer injection molding process. Or the window frame assembly seal 64 could comprise, for example, a one sided or one sided and edge window frame assembly seal 64 that is disposed on and around the window frame periphery 68.

Figure 5:
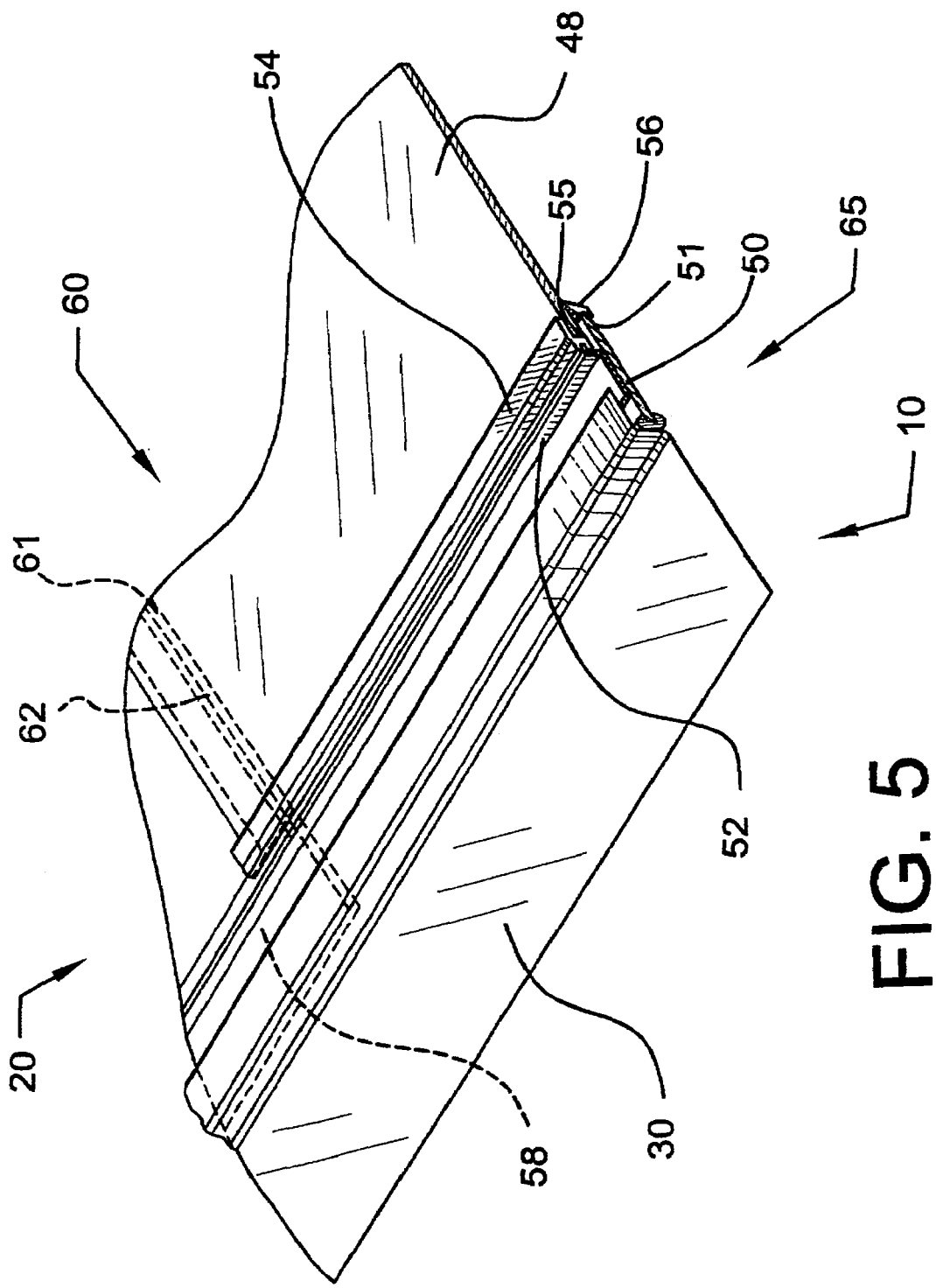
FIG. 5 is an elevation, cut-away view of a lower portion of the window assembly when an at least one slider panel is covering a portion of a window aperture.

FIG. 5 shows an elevation, cut-away view of a bottom portion of the substantially flush mounted vehicular backlite window frame assembly 10, from a perspective of being within the vehicle passenger compartment, where a portion of the window aperture 60 is shown. As shown, the window frame assembly 20 is mounted in the vehicle body aperture 65 of the vehicle body frame 30. A second slider seal 56 is attached to a second fascia edge 51 of a second fascia panel 50. Note that the fixed panel 58 includes the first and second fascia panels 40, 50. The second slider seal 56 works in conjunction with the pillar seal 62, which is disposed near to the fixed panel edge 61, to seal noise and moisture out of the vehicle passenger compartment. The second fascia edge 51 is perpendicular to the fixed panel edge 61 and the slider seal 56 is perpendicular to the pillar seal 62. The second fascia panel 50 could comprise, for example, glass or plastic. The second slider seal 56 could comprise, for example, ethylene propylene diene monomer.

Also shown is a second stationary rail 52, which extends the full length of the window frame assembly 20 and is attached to the second fascia panel 50 and the at least one fixed panel 58, while running parallel to, and in close proximity to, the window aperture 60 formed by a second fascia edge 51. The second stationary rail 52 mates with a second locator rail 54, which is attached to a second slider panel edge 55 of the at least one slider panel 48. The first stationary rail 42 and the second stationary rail 52 are parallel to each other.

Figure 6:
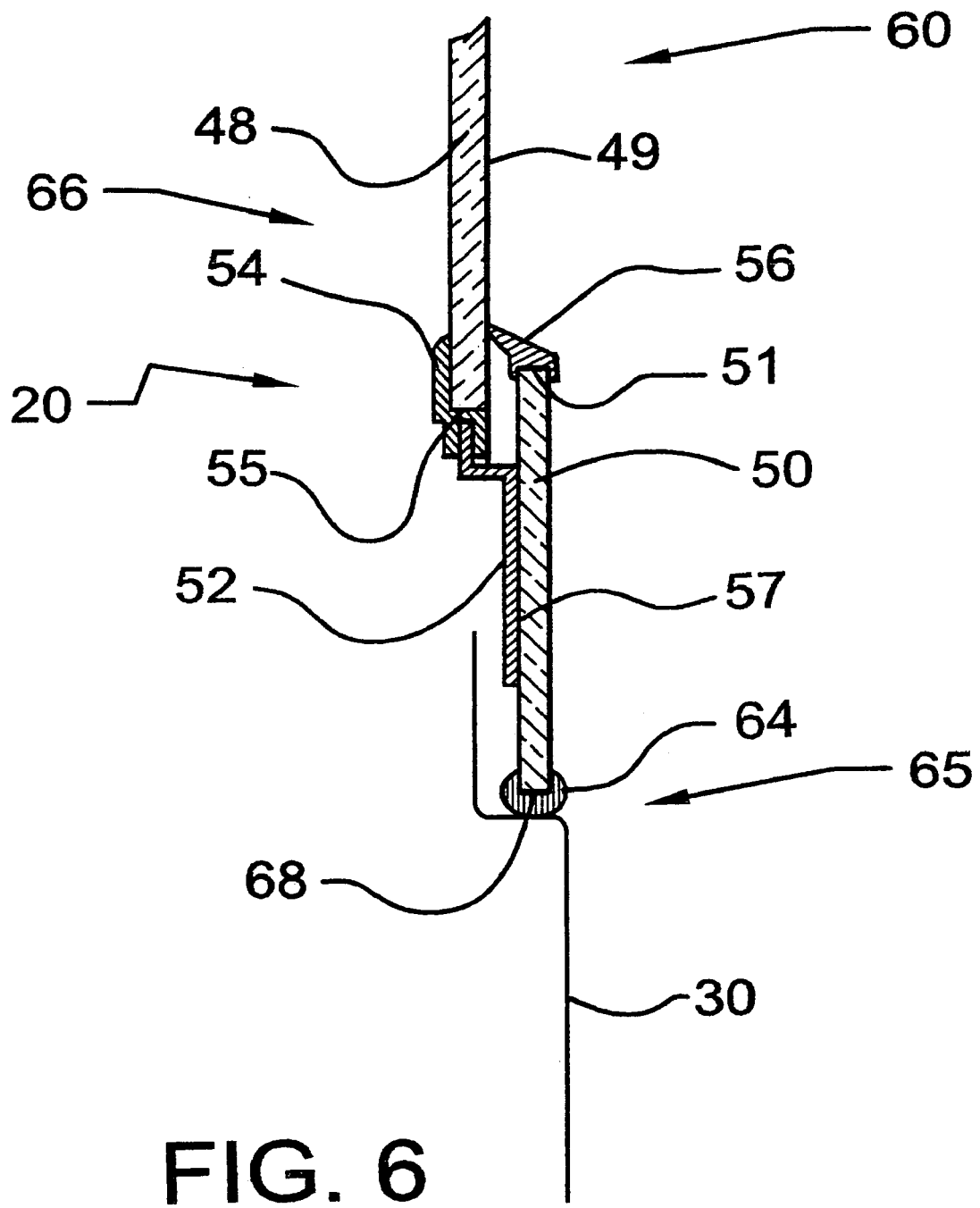
FIG. 6 is the lower portion, sectional view, taken in the direction of the arrows, along the section line 2—2 of FIG. 1.

Referring to FIG. 6, there is shown a sectional view of a lower portion of FIG. 1, taken along the viewing line 2—2. The second stationary rail 52 is attached to a second fascia surface 57 of the second fascia panel 50. The second stationary rail 52 mates with, and, consequently, provides the sliding pathway for the sliding panel assembly 66 that comprises the second locator rail 54, which is attached to a second slider panel edge 55 on the at least one slider panel 48, to allow sliding movement across the window frame assembly 20.

Also shown is the second slider seal 56 that is attached to the second fascia edge 51 on the second fascia panel 50. The second slider seal 56 makes sealable contact, on the outside of the vehicle passenger compartment, with the at least one slider panel 48 on the slider surface 49 of the at least one slider panel 48. The second slider seal 56 seals out noise and moisture from entering the vehicle passenger compartment when the at least one slider panel 48 is closed across the window aperture 60. At the vehicle body aperture 65, of the vehicle body frame 30, the window frame assembly seal 64 has been disposed on the window frame periphery 68. The window frame assembly seal 64 could comprise, for example, an encapsulation process that could be formed by a reaction injection molding process or a thermoplastic elastomer injection molding process. Or the window frame assembly seal 64 could comprise, for example, a one sided or one sided and edge window frame assembly seal 64 that is disposed on and around the window frame periphery 68.

Figure 7:
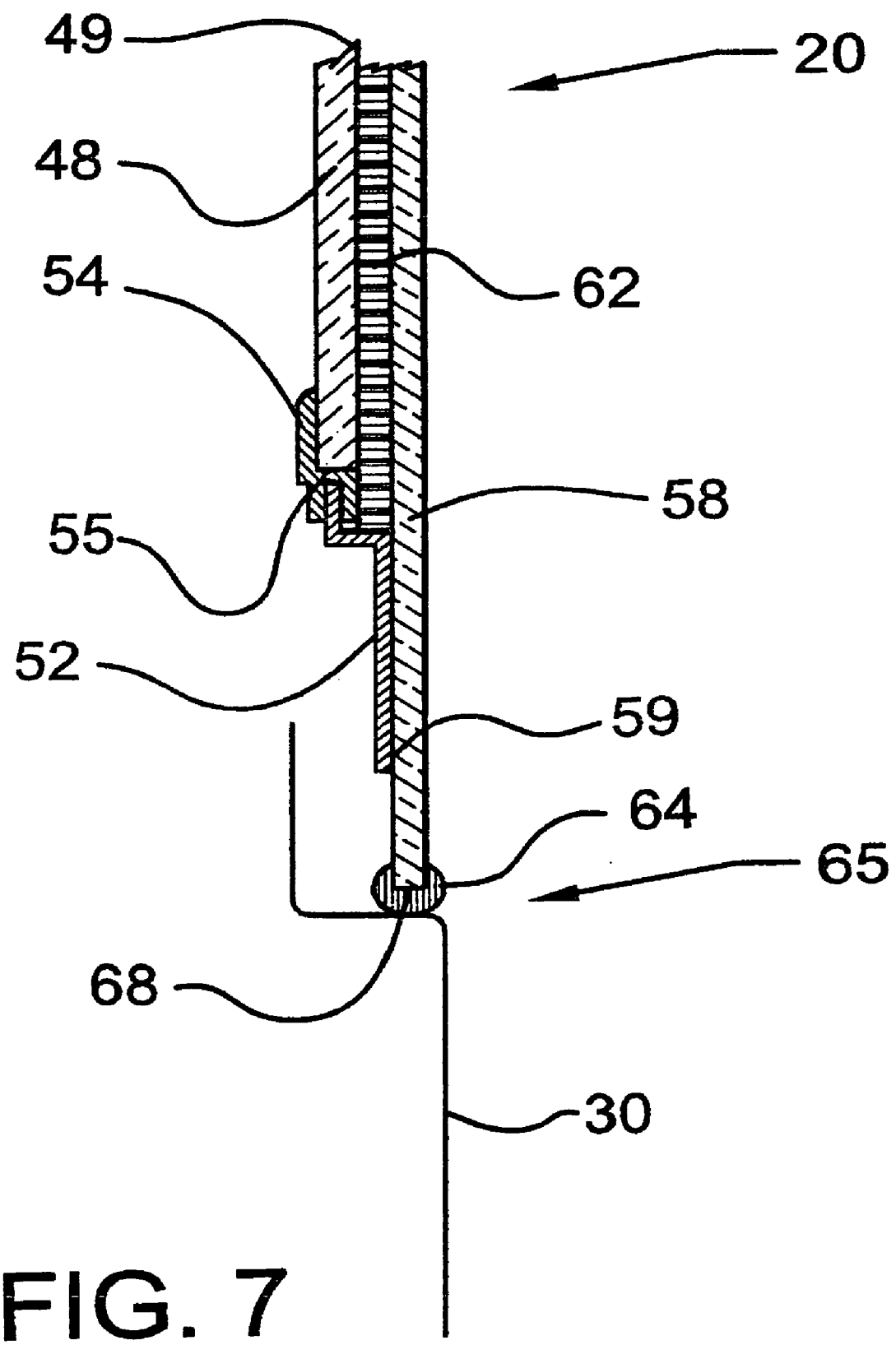
FIG. 7 is the lower portion, sectional view, taken in the direction of the arrows, along the section line 3—3 of FIG. 1.

Further, FIG. 7 shows a sectional view of a lower portion of FIG. 1, taken along the viewing line 3—3. The second stationary rail 52 is attached to the fixed panel surface 59 on the at least one fixed panel 58. The second stationary rail 52 mates with and consequently provides the sliding pathway for the second locator rail 54, which is attached to the second slider panel edge 55 on the at least one slider panel 48. This operates to: (1) contain the assemblage of the second locator rail 54 and the at least one slider panel 48 within the window frame assembly, (2) maintain a separation between the assemblage of the second locator rail 54 and the at least one slider panel 48, and the at least one fixed panel 58, and (3) allow the assemblage of the second locator rail 54 and the at least one slider panel 48 to slide across the lower portion of the window frame assembly 20.

Also shown is the pillar seal 62 that is attached to the fixed panel surface 59, near to the vertical window aperture 60 (shown in FIG. 5) of the at least one fixed panel 58. The pillar seal 62 makes sealable contact with the at least one slider panel 48 on the outside slider surface 49 of the at least one slider panel 48, in order to seal out noise and moisture from entering the vehicle passenger compartment when the at least one slider panel 48 is closed across the window aperture 60. At the vehicle body aperture 65, of the vehicle body frame 30, the window frame assembly seal 64 has been disposed on the window frame periphery 68. The window frame assembly seal 64 could comprise, for example, an encapsulation process that could be formed by a reaction injection molding process or a thermoplastic elastomer injection molding process. The window frame assembly seal 64 could also comprise, for example, a one-sided or one-sided and edge window frame assembly seal 64 that is disposed on and around the window frame periphery 68.

Figure 8:
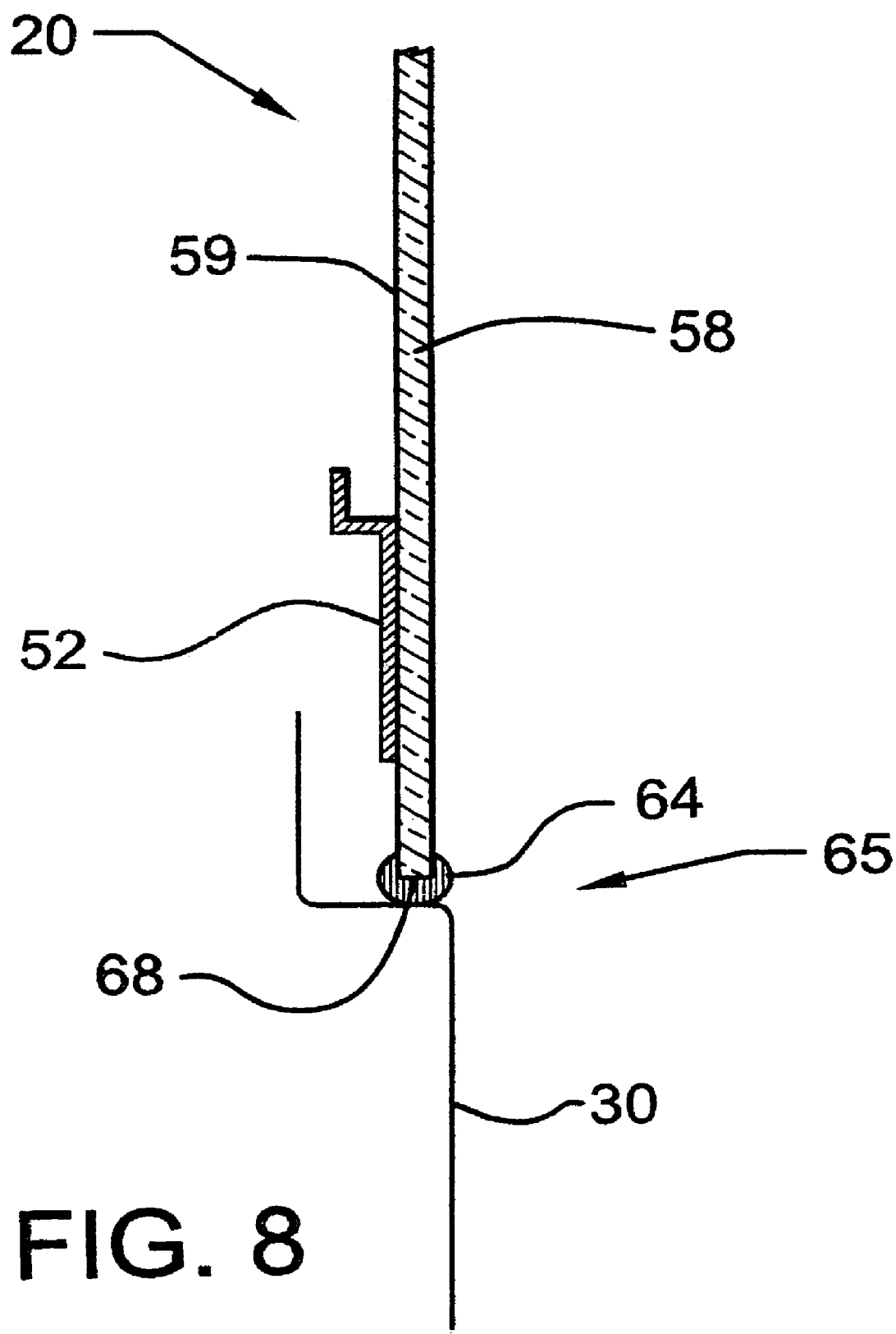
FIG. 8 is the lower portion, sectional view, taken in the direction of the arrows, along the section line 4—4 of FIG. 1.

Illustrated in FIG. 8 is a sectional view of the lower portion of the window frame assembly 20 in FIG. 1, taken along the viewing line 4—4. The second stationary rail 52 is attached to the fixed panel surface 59 on the at least one fixed panel 58. At the vehicle body aperture 65, of the vehicle body frame 30, the window frame assembly seal 64 has been disposed on the window frame periphery 68.

Figure 9:
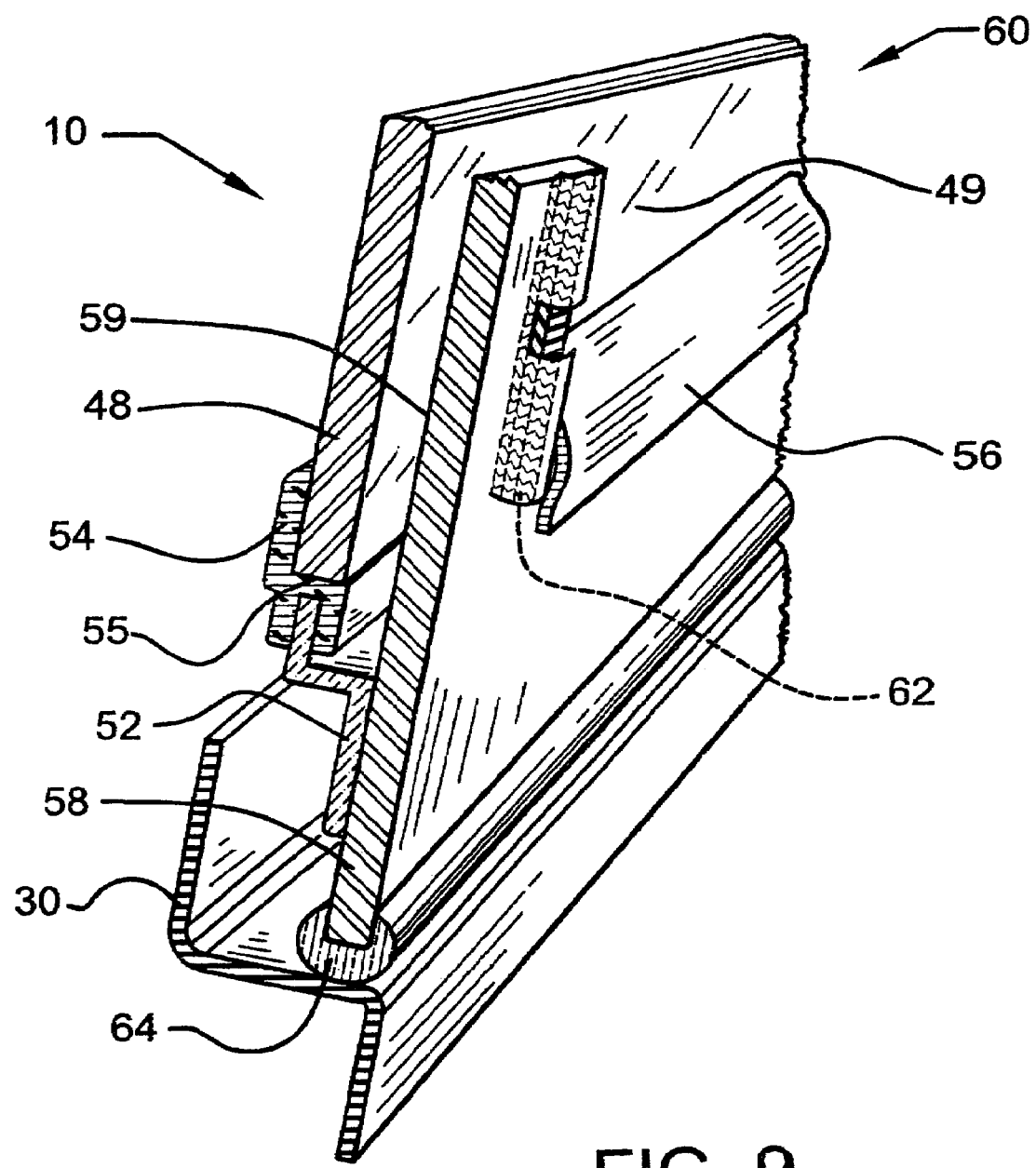
FIG. 9 is a perspective view of a sectional view, taken from a side of the window aperture in accordance with a single fixed panel embodiment of the present invention.

In FIG. 9, there is shown a perspective view of a sectional view of a single fixed panel embodiment of the substantially flush mounted vehicular backlite window frame assembly 10, from a side of the window aperture 60. The vehicle body frame 30 is shown surrounding the at least one fixed panel 58, upon which the second stationary rail 52, the pillar seal 62, the second slider seal 56, and the window frame assembly seal 64 are disposed. The pillar seal 62 and the second slider seal 56 sealably abut each other, while the window frame assembly seal 64 and the vehicle body frame 30 sealably abut each other. Also shown is the at least one slider panel 48 which has the slider surface 49 and upon which the second locator rail 54 is disposed. By way of the second locator rail 54, which is disposed onto the second slider panel edge 55, the at least one slider panel 48 is brought into mating contact with the second stationary rail 52, which makes the at least one slider panel 48 capable of sliding movement across the full length of the second stationary rail 52 and consequently makes the at least one slider panel 48 capable of at least partially closing the window aperture 60.

The at least one slider panel 48 makes sealable contact with the pillar seal 62 and the second slider seal 56 when the at least one slider panel 48 at least partially closes the window aperture 60, thus preventing moisture and noise from passing through the window aperture 60.

Figure 10:
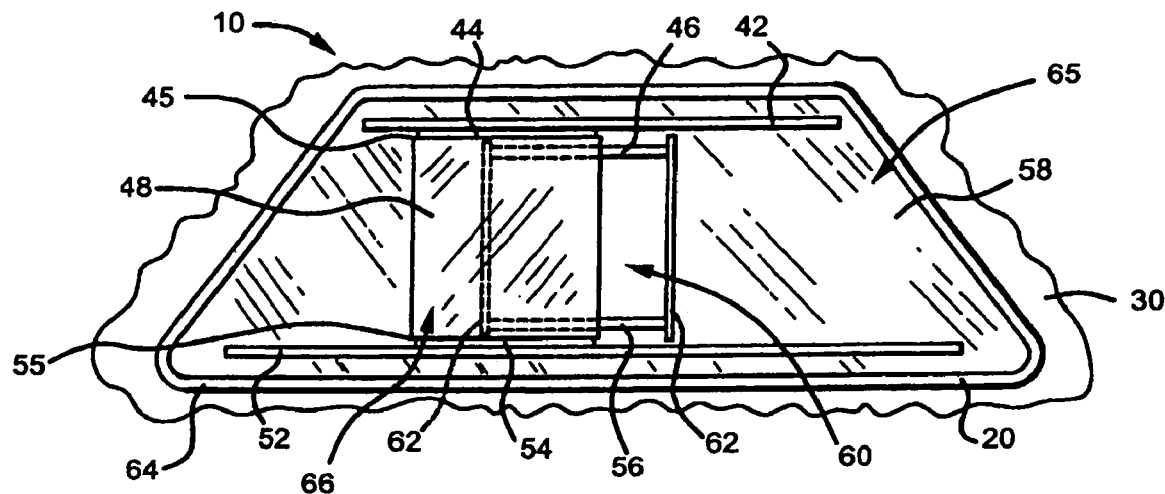
FIG. 10 is an elevation view of the window frame assembly of FIG. 9.

FIG. 10 shows a complete elevation view, taken as one would view the window frame assembly 20 from inside the vehicle, of the single fixed panel 58 embodiment of the present invention. As illustrated, FIG. 10 is FIG. 9 with substantially the remaining portion of FIG. 9 and having the herein-stated features of FIG. 9.

A method of forming a substantially flush mounted vehicular window frame assembly is provided that comprises: 1) forming a window aperture between an abutment of a first fascia panel, a second fascia panel, and two fixed panels, 2) forming a window frame periphery by extending the abutment of the first fascia panel, second fascia panel, and the fixed panels away from the window aperture, 3) disposing a first stationary rail on a first fascia surface of the first fascia panel, 4) disposing a second stationary rail on a second fascia surface of the second fascia panel, 5) disposing a window frame assembly seal on the window frame periphery, 6) disposing a first locator rail onto a first slider panel edge of at least one slider panel, 7) disposing a second locator rail onto a second slider panel edge of the at least one slider panel, 8) mounting the assemblage of the at least one slider panel, the first locator rail, and the second locator rail between the first stationary rail and the second stationary rail, 9) disposing a first slider seal onto the first fascia edge, 10) disposing a second slider seal onto the second fascia edge, and 11) disposing a pillar seal onto each fixed panel surface.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A window frame assembly, comprising:
 a one piece fixed panel defining a plane, the fixed panel having a window aperture defined therein, the window aperture having an upper aperture edge and a lower aperture edge that are parallel to each other;

a first stationary rail and a second stationary rail disposed on a major inner surface of the fixed panel, the first stationary rail being positioned above and parallel to the upper aperture edge, and the second stationary rail being positioned below and parallel to the lower aperture edge, the rails being only in a plane offset to the plane of the window aperture; and a sliding panel assembly comprising at least one slider panel having opposed first and second slider panel edges, a first locator rail disposed onto the first slider panel edge, and a second locator rail disposed onto the second slider panel edge;

wherein the first locator rail is brought into mating contact with the first stationary rail and the second locator rail is brought into mating contact with the second stationary rail, the sliding panel assembly being capable of sliding movement across the stationary rails in the offset plane and at least partially closing the window aperture.

2. The window frame assembly of claim 1 further comprising slider seals disposed on substantially the entirety of the upper and lower aperture edges and capable of making sealable contact with at least one major surface of the slider panel when the slider panel at least partially closes the window aperture.

3. The window frame assembly of claim 2 further comprising pillar seals disposed on the major inner surface of the fixed panel, across the entirety of remaining window aperture edges, sealably abutting the slider seals, and making sealable contact with the at least one major surface of the slider panel when the slider panel at least partially closes the window aperture, thus preventing moisture and noise from passing through the window aperture.

4. The window frame assembly of claim 1, wherein the fixed panel has a seal disposed on a window frame periphery thereof.

5. The window frame assembly of claim 1, wherein the fixed panel and slider panel comprise glass and/or plastic.

6. A window frame assembly, comprising:
a first fascia panel having a first fascia edge and a first major fascia inner surface;
a second fascia panel having a second fascia edge and a second major fascia inner surface, the first fascia edge and the second fascia edge being spaced apart and parallel to each other;
two fixed panels, each having a fixed panel edge and being spaced apart and parallel to each other, the first fascia edge and the second fascia edge being perpendicular to the two fixed panel edges, the fascia panels and the fixed panels defining a plane and further defining a window aperture therein, each fixed panel having a major fixed panel inner surface, wherein the first fascia panel, the second fascia panel, and the two fixed panels comprise glass and/or plastic, and the first fascia panel, the second fascia panel, and the two fixed panels extend away from the window aperture, while each fascia panel separately abuts each fixed panel, to form a periphery of a frame of the window frame assembly;
a first stationary rail disposed onto the first major fascia inner surface of the first fascia panel, the first stationary rail also being disposed onto at least a portion of each of the major fixed panel inner surfaces, the first fascia panel and the fixed panel inner surfaces being in the plane of the window aperture and the first stationary rail being above and parallel to the first fascia edge, while extending toward the window frame periphery of the window frame assembly;
a second stationary rail disposed onto the second major fascia inner surface of the second fascia panel, the second stationary rail also being disposed onto at least a portion of each of the major fixed panel inner surfaces, and the second stationary rail being below and parallel to the second fascia edge, the second fascia panel and the fixed panel inner surfaces being in the plane of the window aperture while extending toward the window frame periphery of the window frame assembly, the first and second stationary rails being only in a plane offset to the plane of the window aperture.

7. The window frame assembly of claim 6, the window frame assembly further comprising a seal, wherein the seal comprises a reaction injection molded urethane gasket.

8. The window frame assembly of claim 6, the window frame assembly further comprising a seal, wherein the seal comprises a thermoplastic elastomer gasket.

9. A substantially flush mounted vehicular window frame assembly, comprising:
a first fascia panel having a first fascia edge and a first major fascia inner surface;
a second fascia panel having a second fascia edge and a second major fascia inner surface;
the first fascia edge and the second fascia edge being spaced apart and parallel to each other;
two fixed panels, each having a fixed panel edge and being spaced apart and parallel to each other, and each fixed panel having a major fixed panel inner surface;
the first fascia edge and the second fascia edge being perpendicular to the two fixed panel edges, the first and second fascia edges and the two fixed panel edges defining a plane further defining a window aperture therebetween, and in the plane so defined, the first fascia panel, the second fascia panel, and the two fixed panels extending away from the window aperture while each fascia panel separately abuts each fixed panel, to form a frame of the window frame assembly;
a first stationary rail being disposed onto the first major fascia inner surface and at least a portion of the major fixed panel inner surfaces, the first fascia panel and the fixed panel inner surfaces being in the plane of the window aperture, and the first stationary rail being above and parallel to the first fascia edge, while extending toward the window frame periphery of the window frame assembly;
a second stationary rail being disposed onto the second major fascia inner surface and at least a portion of the major fixed panel inner surfaces, and the second stationary rail being below and parallel to the second fascia edge, the second fascia panel and the fixed panel inner surfaces being in the plane of the window aperture while extending toward the window frame periphery of the window frame assembly, the first and second stationary rails being only in a plane offset to the plane of the window aperture;
at least one slider panel having a first slider panel edge and a second slider panel edge;
a first locator rail being disposed onto the first slider panel edge;
a second locator rail being disposed onto the second slider panel edge;
the first locator rail mating with the first stationary rail and the second locator rail mating with the second stationary rail, with the at least one slider panel therebetween;

the assemblage so formed being dimensioned so as to slidably traverse the displacement between the first stationary rail and the second stationary rail across the span of the window frame assembly in the plane offset to the plane of the window aperture;

wherein the window frame assembly is disposed into a vehicle body aperture of a vehicle body frame, whereby the two fixed and the two fascia panels are substantially flush with the exterior surface of the vehicle body.

10. The substantially flush mounted vehicular window frame assembly of claim 9, wherein the first fascia panel, second fascia panel, the two fixed panels, and the at least one sliding panel comprise glass and/or plastic.

11. The substantially flush mounted vehicular window frame assembly of claim 9, the window frame assembly comprising a seal, wherein the seal comprises a urethane gasket molded in situ by means of reaction injection molding.

12. The substantially flush mounted vehicular window frame assembly of claim 9, the window frame assembly further comprising a seal, wherein the seal comprises a thermoplastic elastomer gasket.

13. The substantially flush mounted vehicular window frame assembly of claim 9, further comprising at least one slider seal wherein the slider seal comprises an ethylene propylene diene monomer.

14. The substantially flush mounted vehicular window frame assembly of claim 9, further comprising at least one pillar seal wherein the at least one pillar seal comprises an ethylene propylene diene monomer.

15. The substantially flush mounted vehicular window frame assembly of claim 9, further comprising a window frame assembly seal wherein the seal has one side disposed on the panel surfaces.

16. The window frame assembly of claim 9, further comprising slider seals disposed on substantially the entirety of the upper and lower aperture edges and capable of making sealable contact with at least one major surface of the slider panel when the slider panel at least partially closes the window aperture.

17. The window frame assembly of claim 16, further comprising pillar seals disposed on the major inner surface of the fixed panels, across the entirety of remaining window aperture edges, sealably abutting the slider seals, and making sealable contact with the at least one major surface of the slider panel when the slider panel at least partially closes the window aperture, thus preventing moisture and noise from passing through the window aperture.

18. A window frame assembly, comprising:

a fixed panel defining a plane, the fixed panel having a window aperture defined therein, the window aperture having an upper aperture edge and a lower aperture edge that are parallel to each other;

a first stationary rail and a second stationary rail disposed on a major inner surface of the fixed panel, the first stationary rail being positioned above and parallel to the upper aperture edge, and the second stationary rail being positioned below and parallel to the lower aperture edge, the rails being in a plane offset to the plane of the window aperture; and a sliding panel assembly comprising at least one slider panel having opposed first and second slider panel edges, a first locator rail disposed onto the first slider panel edge, and a second locator rail disposed onto the second slider panel edge;

wherein the first locator rail is brought into mating contact with the first stationary rail and the second locator rail is brought into mating contact with the second stationary rail, the sliding panel assembly being capable of sliding movement across the stationary rails in the plane offset to the plane of the window aperture and at least partially closing the window aperture, and the fixed panel and the sliding panel comprising glass and/or plastic.

* * * * *